(12) United States Patent
Kang (10) Patent No.: US 8,046,031 B2
(45) Date of Patent: *Oct. 25, 2011

(54) MOBILE COMMUNICATION TERMINAL AND METHOD FOR CONTROLLING BROADCAST PROGRAM

(75) Inventor: Yu Chan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 725 days.

This patent is subject to a terminal disclaimer.

(21) Appl. No.: 11/621,058

(22) Filed: Jan. 8, 2007

(65) Prior Publication Data

US 2007/0173221 A1 Jul. 26, 2007

(30) Foreign Application Priority Data

Jan. 24, 2006 (KR) .................. 10-2006-0007225

(51) Int. Cl.
*H04B 1/38* (2006.01)
(52) U.S. Cl. ............ 455/574; 455/343.1; 455/572; 455/343.4; 455/127.5

(58) Field of Classification Search ............ 455/343.1, 455/574, 572, 343.4, 127.5
See application file for complete search history.

(56) References Cited

U.S. PATENT DOCUMENTS

| | | | | |
|---|---|---|---|---|
| 7,143,214 B2 * | 11/2006 | Hayes et al. | ............ | 710/72 |
| 7,289,166 B2 * | 10/2007 | Kimura | ............ | 348/730 |
| 7,543,167 B2 * | 6/2009 | Nakano | ............ | 713/320 |
| 2005/0046390 A1 * | 3/2005 | Kimura | ............ | 320/132 |
| 2007/0067801 A1 * | 3/2007 | Monta et al. | ............ | 725/44 |
| 2009/0023482 A1 * | 1/2009 | Koura et al. | ............ | 455/574 |
| 2009/0164823 A1 * | 6/2009 | Aaltonen et al. | ............ | 713/340 |

FOREIGN PATENT DOCUMENTS

JP 2005-142796 6/2005
* cited by examiner

*Primary Examiner* — Yuwen Pan
(74) *Attorney, Agent, or Firm* — Lee, Hong, Degerman, Kang & Waimey

(57) ABSTRACT

A mobile communication terminal and method of controlling a broadcast program are disclosed, by which the inability to view or record a reserved broadcast program is prevented and by which information related to the availability of a reserved broadcast program for viewing or recording with reference to a battery capacity can be provided to a user in real time.

12 Claims, 5 Drawing Sheets

| Program Reservation |||
|---|---|---|
| TV 1  TV 2  TV 3  Radio 1  ◁ ▷ |||
| Time | Program title | |
| 09:00 ~09:30 | Topic news | |
| 09:30 ~10:00 | Special sports | |
| 10:00 ~12:00 | Special movie <Die Hard> | |
| 12:00 ~12:30 | Sports world | |
| 12:30 ~14:30 | Drama <Kim Sam-Soon> | |
| Menu | Select | Previous |

| Program reservation information | | |
|---|---|---|
| Priority | Program title | Viewing availability |
| 1 | Topic news | 100% |
| 2 | Sports world | 80% |
| 3 | Special sports | 50% |

Viewable time 52 minutes

| Menu | Confirm | Previous |

FIG. 6

Battery information

Battery must be charged
in order to view [Special Sports]

| Menu | Confirm | Previous |

FIG. 7

| Program reservation information | | |
|---|---|---|
| Priority | Program title | Recording availability |
| 1 | Topic news | 100% |
| 2 | Sports world | 80% |
| 3 | Special sports | 50% |

Recordable time 52 minutes

| Menu | Confirm | Previous |

FIG. 8

Battery information

Battery must be charged
in order to record [Special Sports]

| Menu | Confirm | Previous |

MOBILE COMMUNICATION TERMINAL AND METHOD FOR CONTROLLING BROADCAST PROGRAM

CROSS-REFERENCE TO RELATED APPLICATIONS

Pursuant to 35 U.S.C. §119(a), this application claims the benefit of earlier filing date and right of priority to Korean Application No. 10-2006-0007225, filed of Jan. 24, 2006, the contents of which is hereby incorporated by reference herein in its entirety.

FIELD OF THE INVENTION

The present invention is directed to a mobile communication terminal, and more specifically, to a mobile communication terminal and method for controlling a broadcast program. Although the present invention is suitable for a wide scope of applications, it is particularly suitable for controlling broadcast programs by measuring a current battery capacity.

DESCRIPTION OF THE RELATED ART

Figure 1:
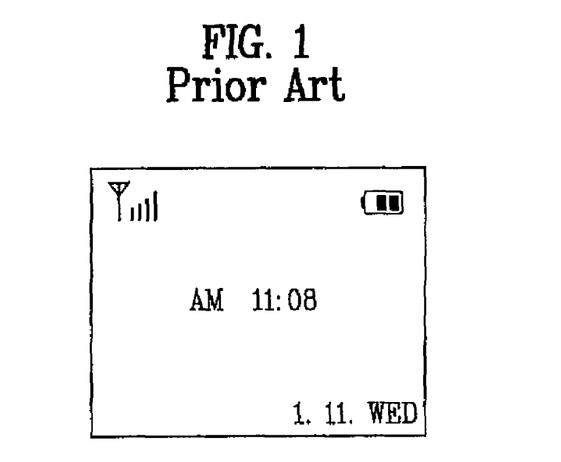
FIG. 1 is a diagram illustrating the display of remaining battery capacity in a conventional mobile communication terminal.

Generally, a mobile communication terminal consumes a considerable quantity of battery power when playing or recording multimedia. A mobile communication terminal according to a related art displays a current battery capacity by presenting a plurality of bars on the upper right side of a display screen as illustrated in FIG. 1.

For example, the mobile communication terminal displays all three bars when a battery capacity is sufficient or full. If the battery capacity is reduced by degrees, the mobile communication terminal displays two of the three bars. If the battery capacity is almost depleted, the mobile communication terminal displays one or none of the three bars.

Figure 2:
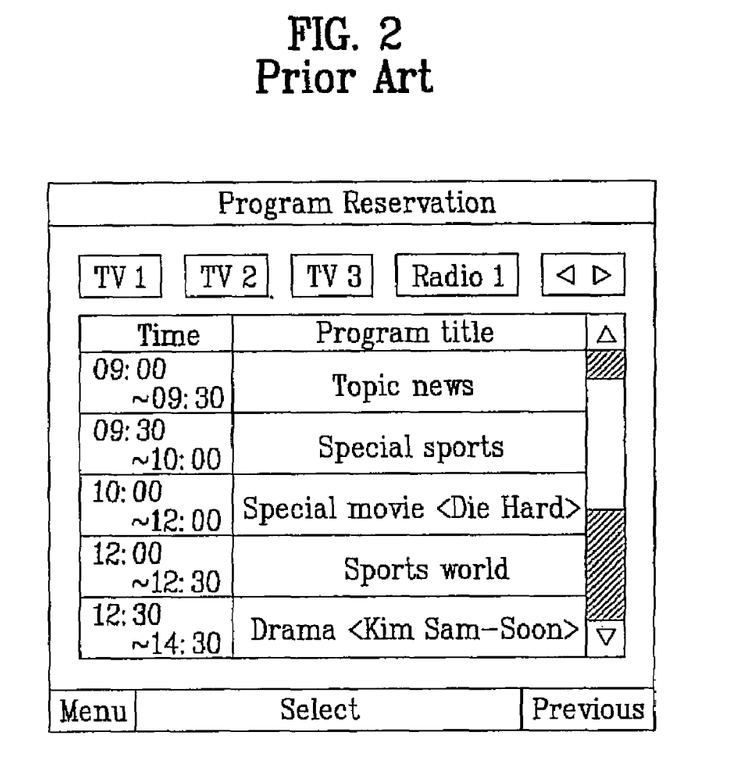
FIG. 2 is a diagram illustrating a conventional method for displaying broadcast program information in a mobile communication terminal.

The mobile communication terminal is able to receive and display a broadcast program. The mobile communication terminal is also able to reserve a viewing or recording of a program to be received. For example, the mobile communication terminal is able to reserve a broadcast program using broadcast program information by EPG (electronic program guide) for a DMB (digital multimedia broadcasting system, as shown in FIG. 2.

However, it may be impossible to view or record the reserved broadcast program in part even if a viewing or recording reservation for a broadcast program is available due to limitations of the battery capacity of the mobile communication terminal. Furthermore, a user of the mobile communication terminal is unable to recognize when it is not possible to view or record a portion of the reserved broadcast program according to a current battery capacity.

SUMMARY OF THE INVENTION

An object of the present invention is to provide a mobile communication terminal and method for controlling a broadcast program, by which the inability to view and record a reserved broadcast program is prevented. Another object of the present invention is to provide a mobile communication terminal and method for controlling a broadcast program, by which information related to the ability to view or record a currently reserved broadcast program according to battery capacity can be provided to a user in real time. Another object of the present invention is to provide a mobile communication terminal and method for controlling a broadcast program, by which information related to the ability to view or record a currently viewed or recorded broadcast program according to battery capacity can be provided to a user in real time.

In one aspect of the present invention, a method of controlling a broadcast program in a mobile communication terminal is provided. The method includes calculating an estimated battery consumption related to a broadcast program, calculating a current remaining battery capacity, comparing the estimated battery consumption to the current remaining battery capacity and generating a control signal according to a result of the comparison.

It is contemplated that the method further includes receiving guide information related to the broadcast program and calculating the estimated battery consumption using the guide information. It is further contemplated that the estimated battery consumption is calculated using a previous average broadcast time of the broadcast program.

It is contemplated that the estimated battery consumption is calculated using battery consumption information related to characteristics of the mobile communication terminal. It is further contemplated that the method further includes outputting information related to battery capacity according to the result of the comparison.

It is contemplated that the method further includes setting at least one of a viewing reservation and a recording reservation for a broadcast program and calculating the battery consumption related to at least one of viewing and recording the reserved broadcast program. It is further contemplated that the method further includes determining if reservation priorities are set among a plurality of reserved broadcast programs and outputting information related to battery capacity according to the reservation priorities and the result of the comparison.

It is contemplated that the method further includes displaying the information related to battery capacity according to an increasing sequence of the reservation priorities. It is further contemplated that the method further includes calculating the estimated battery consumption related to at least one of a currently viewed broadcast program and a currently recorded broadcast program.

It is contemplated that the method further includes determining if the current remaining battery capacity is equal to or smaller than a reference capacity and outputting information related to battery capacity for at least one of the currently viewed broadcast program and the currently recorded broadcast program. It is further contemplated that the method further includes outputting information related to battery capacity according to the control signal when the current remaining battery capacity is equal to or smaller than the estimated battery consumption.

In another aspect of the present invention, a mobile communication terminal having a broadcast program control function is provided. The mobile communication terminal includes a battery adapted to supply power necessary for operation of the mobile communication terminal, a memory adapted to store information related to a broadcast program and control unit adapted to calculate an estimated battery consumption related to the broadcast program, calculate a current remaining battery capacity using the information stored in the memory, compare the calculated estimated battery consumption to the calculated current remaining battery capacity and generate a control signal according to the comparison.

It is contemplated that the mobile communication terminal further includes a transceiver unit adapted to receive guide information related to the broadcast program and the control unit is further adapted to calculate the estimated battery consumption using the received guide information. It is further contemplated that the control unit is further adapted to calculate the estimated battery consumption using a previous average broadcast time of the broadcast program.

It is contemplated that the control unit is further adapted to calculate the estimated battery consumption using battery consumption information related to characteristics of the mobile communication terminal. It is further contemplated that the mobile communication terminal further includes a display unit adapted to output information related to battery capacity according to the result of the comparison.

It is contemplated that the mobile communication terminal further includes an input unit adapted to receive information from a user related to setting at least one of a viewing reservation and a recording reservation for a broadcast program and the control unit is further adapted to calculate the estimated battery consumption related to at least one of viewing and recording the reserved broadcast program. It is further contemplated that the control unit if further adapted to determine if reservation priorities are set among a plurality of the reserved broadcast programs and generate the control signal to output information related to battery capacity according to the reservation priorities and the result of the comparison.

It is contemplated that the control unit is further adapted to generate the control signal according to an increasing sequence of the reservation priorities. It is further contemplated that the control unit is further adapted to generate the control signal to output information related to battery capacity when the current remaining battery capacity is equal to or smaller than the estimated battery consumption.

It is contemplated that the control unit is further adapted to calculate the estimated battery consumption related to at least one of a currently viewed broadcast program and a currently recorded broadcast program. It is further contemplated that the control unit is further adapted to determine that the current remaining battery capacity is equal to or smaller than reference capacity and generate the control signal to output information related to battery capacity for at least one of the currently viewed broadcast program and the currently recorded broadcast program.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will be made in detail to the preferred embodiments of the present invention, examples of which are illustrated in the accompanying drawings. Wherever possible, the same reference numbers will be used throughout the drawings to refer to the same or like parts.

Figure 3:
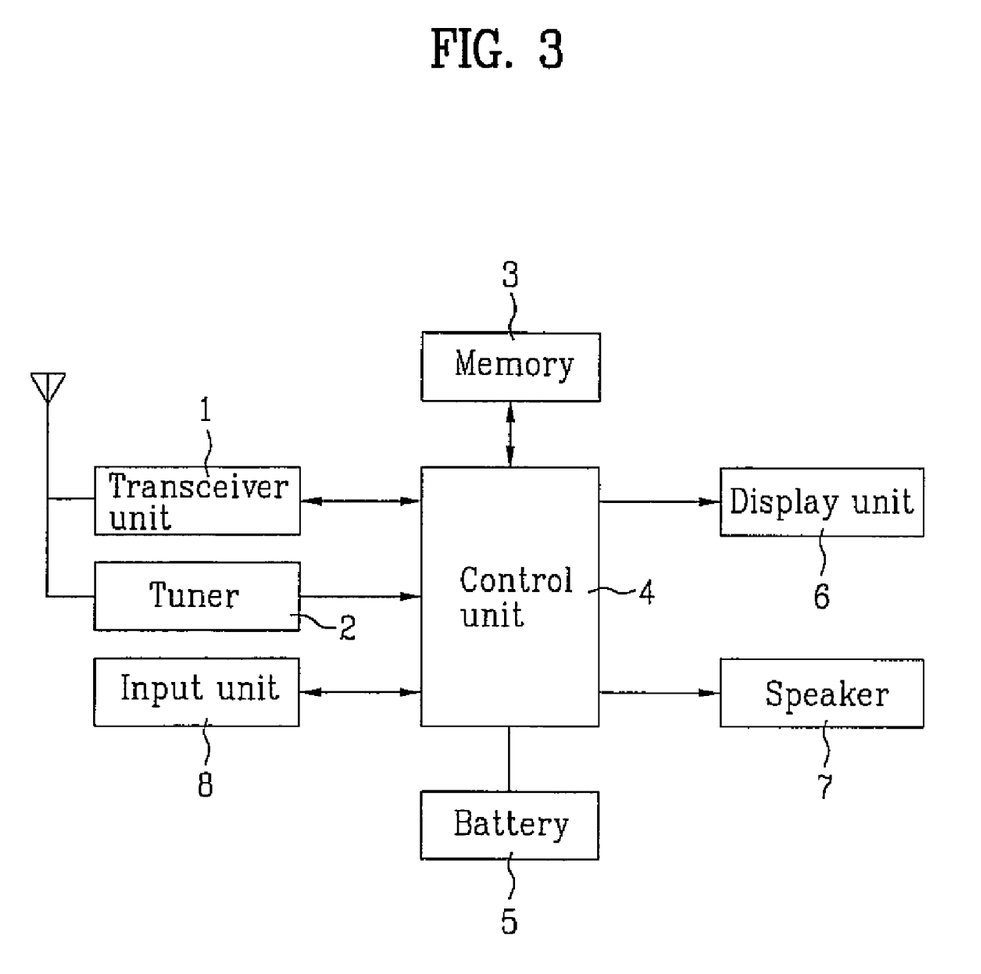
FIG. 3 is a block diagram of a mobile communication terminal having a broadcast program control function according to the present invention.

A mobile communication terminal having a broadcast program control function according to the present invention is explained in detail with reference to FIG. 3. FIG. 3 is a block diagram of a mobile communication terminal having a broadcast program control function according to the present invention.

As illustrated in FIG. 3, the mobile communication terminal includes a battery 5 supplying power necessary for operation of the mobile communication terminal, a memory 3 storing information associated with a broadcast program and a control unit 4 calculating an estimated battery consumption and a current remaining battery capacity using the information stored in the memory 3. The control unit 4 compares the calculated estimated battery consumption to the calculated current remaining battery capacity and outputs a control signal according to the comparison result.

The mobile communication terminal further includes a transceiver unit 1 receiving guide information related to the broadcast program, a display unit 6 outputting information related to battery capacity according to the control signal and an input unit 8 receiving a setting related to a viewing or recording reservation for a broadcast program from a user. Furthermore, the mobile communication terminal includes a tuner 2 receiving a broadcast signal from a broadcast server and a speaker 7 outputting sound according to the control signal of the control unit 4.

The transceiver unit 1 receives a radio signal via a mobile communication network or transmits a radio signal via the mobile communication network. Specifically, the transceiver unit 1 receives the guide information for the broadcast program from the broadcast server that transmits the broadcast program.

The guide information for the broadcast program includes broadcast time information, summary information and channel information for the broadcast program. The guide information provides schematic information for the broadcast program to the user.

For example, the guide information for the broadcast program is guide information of an EPG (electronic program guide) service if the broadcasting system is a DMB (digital multimedia broadcasting) system. Furthermore, the guide information for the broadcast program is guide information of an ESG (electronic service guide) service if the broadcasting system is a DVB-H (digital video broadcasting-handheld) system. The EPG or ESG service is the service that provides guidance information for a broadcast program provided by a broadcasting system.

Optionally, the transceiver unit 1 is able to receive guide information for the broadcast program periodically or according to a request from the mobile communication terminal. Furthermore, the transceiver unit 1 is able to receive the guide information for the broadcast program via a data broadcast channel. Moreover, the transceiver unit 1 receives a broadcast signal and guide information for the broadcast program from the broadcast server via the tuner 2.

The memory 3 stores all data input to and output from the mobile communication terminal as well as various programs necessary for operational control and drive of the mobile communication terminal. Specifically, the memory 3 stores information associated with broadcast programs therein.

The information associated with the broadcast programs includes viewing or recording reservation information for a broadcast program as well as guide information for a specific broadcast program. The guide information for the broadcast program has been explained previously in detail so further explanation is omitted in the following description.

The memory 3 also stores information related to capacity of the battery 5. The information related to battery capacity includes an estimated battery consumption due to a broadcast program and a current remaining battery capacity calculated by the control unit 4. For example, the memory 3 pre-stores a per-hour battery consumption quantity necessary for viewing or recording a broadcast program and a per-hour battery consumption quantity necessary for executing each function of the mobile communication terminal.

The control unit 4 controls overall operation of the mobile communication terminal. Specifically, the control unit 4 outputs a control signal to the display unit 6 in order to periodically output information related to battery capacity.

Furthermore, the control unit 4 outputs a control signal to the display unit 6 in order to periodically output the information related to battery capacity if the current remaining capacity of the battery 5 is equal to or smaller than the estimated consumption quantity. Moreover, the control unit 4 outputs a control signal to the speaker 7 in order to output a sound corresponding to the information related to the battery capacity.

According to one embodiment of the present invention, the control unit 4 calculates the estimated consumption quantity and the current remaining capacity of the battery 5 due to viewing and/or recording a reserved broadcast program. The control unit 4 then compares the calculated estimated consumption quantity to the calculated current remaining capacity and outputs a corresponding control signal.

For example, the control unit 4 calculates the estimated consumption quantity using the per-viewing hour battery consumption quantity and the broadcast time information of the broadcast program stored in the memory 3. The estimated consumption quantity of the corresponding broadcast program can be calculated by multiplying the per-viewing hour battery consumption quantity by the viewing-reserved broadcast time.

The control unit 4 calculates the estimated battery consumption using the per-recording hour battery consumption and the broadcast time information of the broadcast program stored in the memory 3. The estimated battery consumption of the corresponding broadcast program can be calculated by multiplying the per-recording hour battery consumption by the recording-reserved broadcast time.

The broadcast time information can be obtained from the guide information for the broadcast program, battery consumption information according to a previous average broadcast time of the broadcast program or the characteristics of the mobile communication terminal. The control unit 4 periodically or randomly calculates the current remaining battery capacity and compares the calculated current remaining battery capacity to the estimated battery consumption.

For example, if reservation priorities are set among a plurality of reserved broadcast programs, the control unit 4 outputs a control signal to display them according to the reservation priorities. Therefore, the display unit 6 displays battery capacity or alarm information allocated in a sequence of low reservation priorities according to the control signal.

According to another embodiment of the present invention, the control unit 4 calculates the estimated battery consumption and the current remaining battery capacity due to a currently viewed broadcast program and/or a currently recorded broadcast program, compares the calculated estimated battery consumption to the calculated current remaining battery capacity and outputs a corresponding control signal. Explanations of the comparison between the estimated battery consumption and the current remaining battery capacity and the outputted control signal, which are identical to those of the comparison and control signal in the previous embodiment, are omitted in the following description.

According to a further embodiment of the present invention, the control unit 4 is able to select a specific portion from the viewing-reserved or recording-reserved broadcast program according to a selection signal from a user upon determining if the current remaining battery capacity is equal to or smaller than the estimated battery consumption. Alternatively, the control unit 4 is able to select a specific portion of the currently viewed or recorded broadcast program according to a selection signal from the user upon determining if the current remaining battery capacity is equal to or smaller than the estimated battery consumption.

Figure 4:
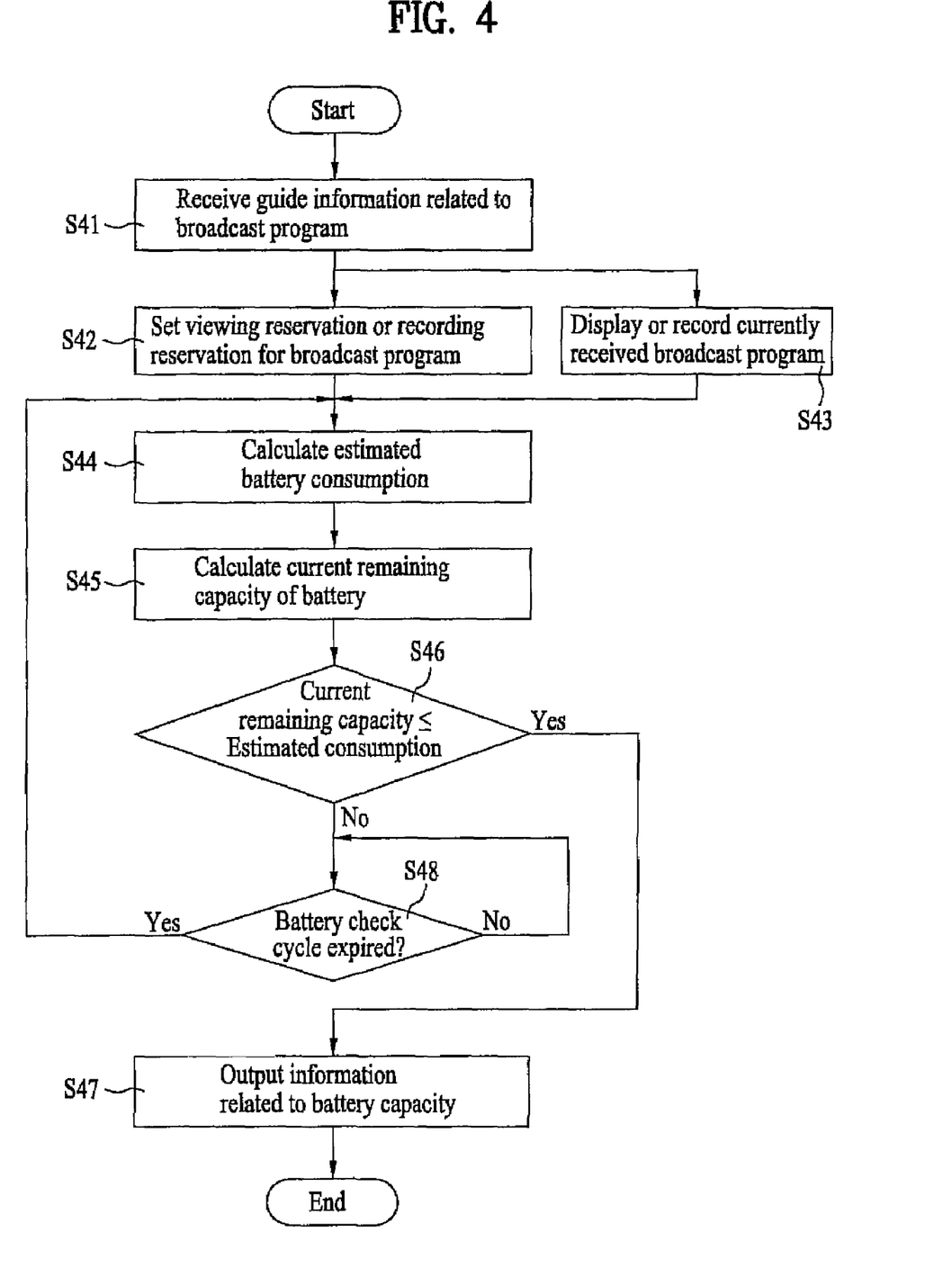
FIG. 4 is a flowchart of a method of controlling a broadcast program in a mobile communication terminal according to the present invention.

A method of controlling a broadcast program in a mobile communication terminal according to the present invention is explained in detail with reference to FIG. 4. FIG. 4 is a flowchart of a method of controlling a broadcast program in a mobile communication terminal according to the present invention.

As illustrated in FIG. 4, the transceiver unit 1 receives guide information related to a broadcast program via the tuner 2 (S41). For example, the transceiver unit 1 periodically may receive guide information related to the broadcast program, via a data broadcast channel, from a broadcast server that transmits the broadcast program.

The guide information related to the broadcast program battery includes broadcast time information, summary information and channel information of the broadcast program. The guide information related to the broadcast program also provides schematic information for the broadcast program to a user.

The input unit 8 sets a viewing or recording reservation for a broadcast program (S42). A user is able to make the viewing or recording reservation using the received guide information related to the broadcast program.

For example, the input unit 8 sets the viewing or recording reservations for a plurality of broadcast programs according to a user's selection. The input unit 8 is able to set a reservation priority sequence of a plurality of broadcast programs.

The control unit 4 then enables a currently received broadcast program to be displayed or recorded (S43). The control unit 4 calculates an estimated battery consumption according to the reserved or currently received broadcast program (S44).

According to one embodiment of the present invention, the control unit 4 calculates the estimated battery consumption due to the reserved viewing and/or recording of the corresponding broadcast program. For example, the control unit 4 calculates the estimated battery consumption using the per-viewing hour battery consumption and the broadcast time information of the broadcast program stored in the memory 3.

The estimated battery consumption of the corresponding broadcast program can be calculated by multiplying the per-viewing hour battery consumption by the viewing-reserved broadcast time. The broadcast time information can be obtained from the guide information for the broadcast program, battery consumption information according to a previous average broadcast time of the broadcast program or the characteristics of the mobile communication terminal.

In another example, the control unit 4 calculates the estimated battery consumption using the per-recording hour battery consumption quantity and the broadcast time information of the broadcast program stored in the memory 3. The estimated battery consumption of the corresponding broadcast program can be calculated by multiplying the per-recording hour battery consumption by the recording-reserved broadcast time.

According to another embodiment of the present invention, the control unit 4 calculates the estimated battery consumption and the current remaining battery capacity due to a currently viewed broadcast program and/or currently recorded broadcast program. The control unit 4 then compares the calculated estimated battery consumption to the calculated current remaining battery capacity. An explanation of the estimated battery consumption calculation, which is identical to the calculation in the previous embodiment, is omitted in the following description.

The control unit 4 then calculates the current remaining battery capacity (S45). For example, the control unit 4 calculates the current remaining battery capacity periodically or randomly. The control unit 4 then determines whether the current remaining battery capacity is equal to or smaller than the estimated battery consumption (S46).

If the current remaining battery capacity is equal to or smaller than the estimated battery consumption, the control unit 4 generates a control signal in order to output information related to battery capacity. The display unit 6 then outputs the information related to battery capacity according to the control signal (S47).

The information related to battery capacity can be simultaneously output as sound via the speaker 7 according to a user's selection. When the notification image is displayed on the screen, a user is able to charge the battery or cut off power of the mobile communication terminal in order to reduce battery consumption.

Figure 6:
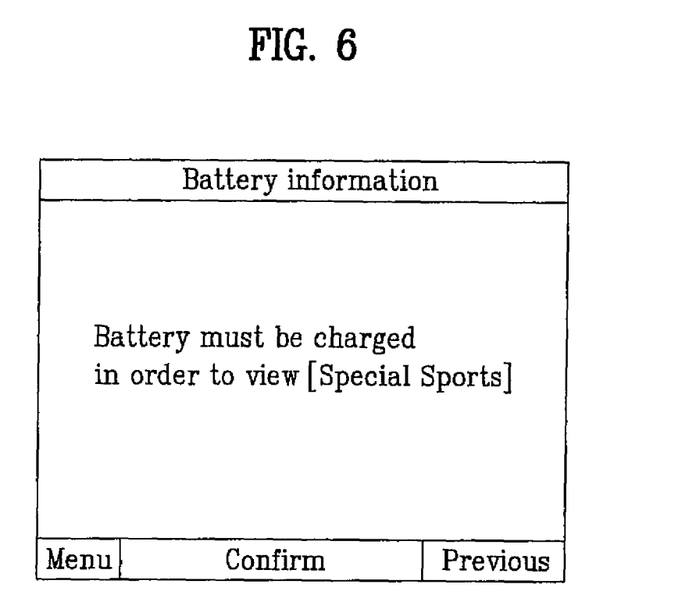
FIG. 6 illustrates displayed information related to viewing availability of a reserved broadcast program according to one embodiment of the present invention.
Figure 8:
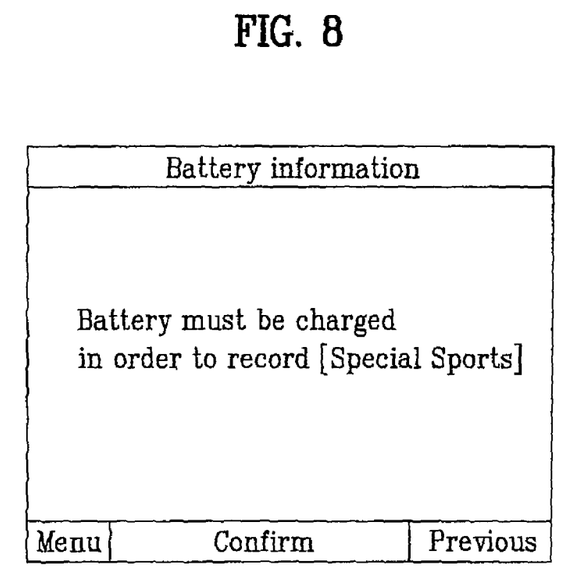
FIG. 8 illustrates displayed information related to recording availability of a reserved broadcast program according to another embodiment of the present invention.

For example, the display unit 6 displays a notification image indicating that the current remaining capacity is less than the estimated consumption quantity necessary for viewing or recording the reserved broadcast program. Specifically, the display unit 6 is able to represent the notification image as a pop-up format, as shown in FIG. 6 or FIG. 8.

The display unit 6 is able to display a notification image according to a lower sequence of reservation priorities if viewing or recording reservations for a plurality of broadcast programs and reservation priorities for the plurality of the broadcast programs are set up. The display unit 6 displays the current remaining quantity of the battery 5 that can be allocated in the lower sequence of the reservation priorities together with the notification image. For example, the display unit 6 displays a notification image indicating that the current remaining battery capacity is less than the estimated battery consumption necessary for viewing or recording the broadcast program.

If the current remaining battery capacity is greater than the estimated battery consumption, the control unit 4 determines whether a battery check cycle has expired (S48). If the battery check cycle has expired, processing returns to step S44.

Figure 5:
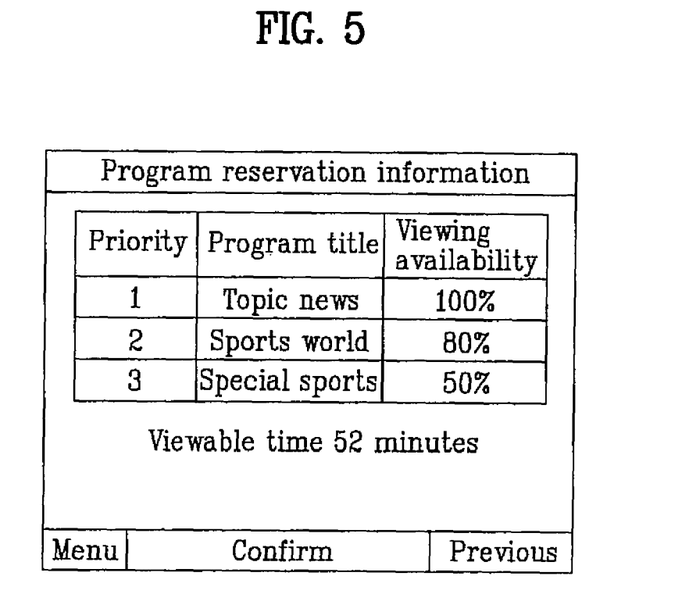
FIG. 5 illustrates displayed information related to a battery according to one embodiment of the present invention.
Figure 7:
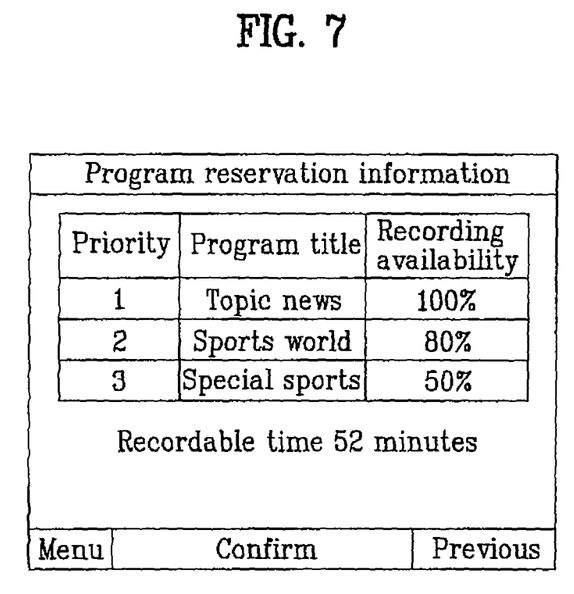
FIG. 7 illustrates displayed information related to a battery according to another embodiment of the present invention.

The displayed status of information related to battery consumption according to the embodiments of the present invention is explained in detail with reference to FIG. 5 and FIG. 7. As illustrated in FIG. 5, the display unit 6 displays a current viewing reservation status of a broadcast program and information for a corresponding viewing availability. As illustrated in FIG. 7, the display unit 6 displays a current recording reservation status of a broadcast program and information for a corresponding recording availability.

The information in FIGS. 5 and 7 can be displayed using a separate key provided in the mobile communication terminal or by using a menu function. A user is able to check a viewing availability of a currently reserved broadcast program at any time and is able to determine an extent of viewing availability of a reserved broadcast program in order to prepare for a current remaining battery capacity that is periodically measured. Therefore, the user is able to decide whether to charge the battery according to a reservation priority of the reserved broadcast program.

The present invention is also applicable to a TV program a radio program or other important data receptions. The present invention provides several effects or advantages.

First, a viewing or recording of a reserved broadcast program can be secured. Second, a viewing or recording of a currently viewed or recorded broadcast program can be secured. Third, a remaining battery capacity can be checked before reserving a broadcast program.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling a broadcast program in a mobile communication terminal, the method comprising:
providing guide information related to one or more broadcast programs;
receiving a user input to select a broadcast program from the guide information;
reserving the selected broadcast program for a future viewing or a future recording;
setting a reservation priority for the selected broadcast program;
determining an estimated battery consumption required for the future viewing or the future recording of the selected broadcast program;
determining a current remaining battery capacity;
comparing the estimated battery consumption to the current remaining battery capacity;
outputting information related to battery capacity information according to a result of the comparison and the reservation priority; and
selecting a portion of the future viewing or the future recording of the selected broadcast program when the current battery capacity is less than or equal to the estimated battery consumption,
wherein the selected portion of the future viewing or the future recording of the selected broadcast program is less than a respective total viewing time or a total recording time of the selected broadcast program.

2. The method of claim 1, wherein determining the estimated battery consumption comprises calculating the estimated battery consumption using the guide information.

3. The method of claim 2, wherein the estimated battery consumption is calculated using a previous average broadcast time of the selected broadcast program.

4. The method of claim 2, wherein the estimated battery consumption is calculated using battery consumption information related to characteristics of the mobile communication terminal.

5. The method of claim 1, wherein the battery capacity information is output when the current remaining battery capacity is equal to or less than a reference value.

6. The method of claim 1, wherein the battery capacity information is output when the current remaining battery capacity is equal to or less than the estimated battery consumption.

7. A mobile communication terminal having a broadcast program control function, the mobile communication terminal comprising:
a battery configured to supply power for operating the mobile communication terminal;
an output unit configured to provide guide information related to at least one broadcast program;
an input unit configured to receive a user input to select a broadcast program from the at least one broadcast program provided via the guide information;
a recording/reproducing unit configured to view or record the selected broadcast program; and
a control unit configured to:
control the recording/reproducing unit to reserve the selected broadcast program for a future viewing or a future recording,
determine a reservation priority for the selected broadcast program, determine an estimated battery consumption required for the future viewing or recording of the selected broadcast program,
determine a current remaining battery capacity,
compare the estimated battery consumption to the current remaining battery capacity,
control the output unit to output battery capacity information according to a result of the comparison and the reservation priority, and
provide the user with an interface to select a portion of the selected broadcast program for the future viewing or the future recording when the current battery capacity is less than or equal to the estimated battery consumption,
wherein the selected portion of the future viewing or the future recording of the selected broadcast program is less than a, respective, total viewing time or a total recording time of the selected broadcast program.

8. The mobile terminal of claim 7, wherein the control unit determines the estimated battery consumption by calculating the estimated battery consumption using the guide information.

9. The mobile terminal of claim 8, wherein the control unit calculates the estimated battery consumption using a previous average broadcast time of the selected broadcast program.

10. The mobile terminal of claim 8, wherein the control unit calculates the estimated battery consumption using battery consumption information related to characteristics of the mobile communication terminal.

11. The mobile terminal of claim 7, wherein the control unit outputs the battery capacity information when the current remaining battery capacity is equal to or less than a reference value.

12. The mobile terminal of claim 7, wherein the control unit outputs the battery capacity information when the current remaining battery capacity is equal to or less than the estimated battery consumption.

* * * * *